(12) United States Patent
Chen et al.

(10) Patent No.: US 8,898,212 B2
(45) Date of Patent: Nov. 25, 2014

(54) METHODS AND APPARATUS FOR REORDERING DATA

(75) Inventors: Ning Chen, Austin, TX (US);
Christopher J. Daniels, Cedar Park, TX (US); Leo G. Dehner, Austin, TX (US);
Gregory C. Ng, Austin, TX (US);
Wendy F. Reed, Austin, TX (US)

(73) Assignee: Freescale Semiconductor, Inc, Austin, TX (US)

( * ) Notice: Subject to any disclaimer, the term of this patent is extended or adjusted under 35 U.S.C. 154(b) by 1360 days.

(21) Appl. No.: 12/288,955

(22) Filed: Oct. 24, 2008

(65) Prior Publication Data

US 2010/0106759 A1    Apr. 29, 2010

(51) Int. Cl.
*G06F 17/14* (2006.01)
(52) U.S. Cl.
CPC ................................. *G06F 17/142* (2013.01)
USPC ........................... 708/404; 708/403; 708/400
(58) Field of Classification Search
USPC ......................................... 708/404, 403, 400
See application file for complete search history.

(56) References Cited

U.S. PATENT DOCUMENTS 4,393,457 A * 7/1983 New ............................. 708/404
5,473,556 A   12/1995 Aguilar et al.
6,035,313 A * 3/2000 Marchant ..................... 708/404
6,907,439 B1 * 6/2005 Wicker ......................... 708/404
7,734,674 B2 * 6/2010 Cohen et al. .................. 708/408
2002/0165683 A1* 11/2002 Lee ................................. 702/77
2004/0001557 A1*  1/2004 Sunwoo ........................ 375/295
2005/0131976 A1*  6/2005 Sunwoo ........................ 708/404
2007/0288542 A1* 12/2007 Shih .............................. 708/404
2009/0268852 A1* 10/2009 Nishikawa .................... 375/340

OTHER PUBLICATIONS

Angelo A. Young "A Better FFT Bit-Reversal Algorithm Without Tables", IEEE Transaction on Signal Processing, vol. 39 No. 10 Oct. 1991 pp. 2365-2367.
James S. Walker, "A New Bit Reversal Algorithm", IEEE Transactions on Acoustics, Speech, and Signal Processing, vol. 38 No. 8 Aug. 1990 pp. 1472-1473.

* cited by examiner

*Primary Examiner* — Lewis A Bullock, Jr.
*Assistant Examiner* — Viva Miller

(57) ABSTRACT

A data reordering system for determining addresses associated with a vector of transformed data and corresponding method of reordering transformed data, where the data reordering system includes: a first transform function coupled to a data vector and operable to provide the vector of transformed data; a reordering function, including a plurality of counters, that is operable to determine a plurality of offset addresses, with a, respective, offset address for each element in the vector of transformed data; and an adder operable to add a base address that corresponds to the first address to the each, respective, offset address to provide a sequence of addresses suitable for accessing the vector of transformed data to provide a re-sequenced vector of transformed data.

20 Claims, 7 Drawing Sheets

METHODS AND APPARATUS FOR REORDERING DATA

FIELD OF THE INVENTION

This invention relates in general to data transformation and more specifically methods and apparatus for reordering data which has been transformed.

BACKGROUND OF THE INVENTION

In present day systems large amounts of data may need to be transformed, e.g. from time to frequency domains, etc. For example, in current and planned communication systems data may be transformed using Fast Fourier transforms (FFT) and the inverse (IFFT), which are efficient approaches to evaluating or finding a discrete Fourier transform (DFT) and its inverse. As is known typical FFT algorithms find an N point DFT by factoring N into factors, e.g., n1, n2, . . . , where the product of these factors equals N and then finding, respective and smaller, n1, n2, . . . point DFTs. A factor is often referred to as a radix and thus in this example, the N point DFT can be provided by performing radix n1, radix n2, and radix etc. DFTs.

When an FFT is performed, the resultant transformed data or DFT will not be in order, i.e., for an input vector with N properly ordered elements or data, 0, 1, . . . , N-1, the output vector will be a permutation of the DFT, i.e., not be in monotonic order. Thus when an FFT is performed, the output or resultant data may have to be reordered for further use. One way to reorder is a Look Up table (LUT), with the index or location in the output vector stored in the LUT, i.e., for the nth element in the DFT, the nth location in the LUT would have the index or location in the FFT output vector where the nth element can be found.

These or similar transforms are often found in, e.g., communication systems employing orthogonal frequency division multiplexing (OFDM). One such system is the 3GPP LTE (3rd Generation Partnership Project) (Long Term Evolution) system. In this system there are 35 or more presently defined FFT sizes. If a LUT is used for all reordering, the LUT would need in excess of 16,500 entries.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns methods, apparatus and systems for reordering data, e.g., data resulting from a transformation between domains. More specifically, techniques and apparatus which include a plurality of counters are used for such data reordering. In one or more embodiments a single step of data reordering is used to provide properly ordered data after a first and a second transformation.

The approaches and concepts, which will be discussed and described are expected to find broad utility. In particular, practitioners working with communications systems that employ OFDM, such as the 3GPP LTE system and the like, where many sizes of transforms are defined may find these techniques helpful, provided they are practiced in accordance with the inventive concepts and principles as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
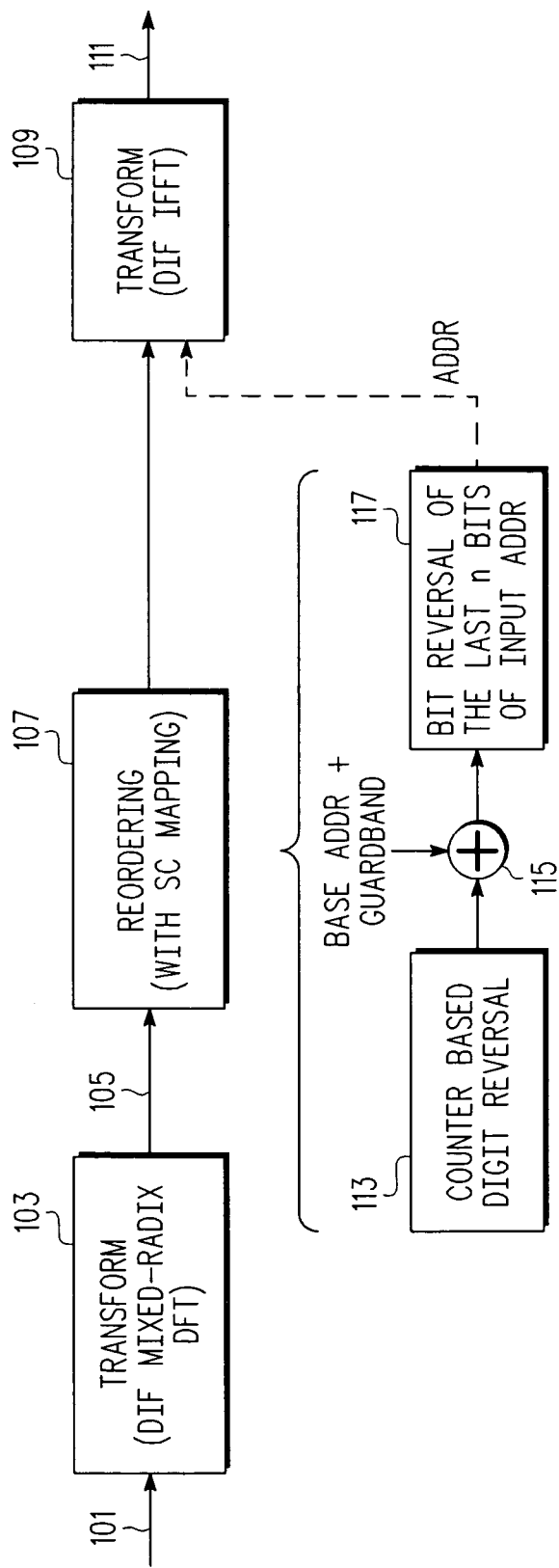
FIG. 1 depicts in a simplified and representative form, a high level block diagram of a data reordering system in accordance with one or more embodiments.

Referring to FIG. 1, a simplified and representative high level block diagram of a data reordering system in accordance with one or more embodiments will be briefly discussed and described. In FIG. 1, a data reordering system for determining addresses associated with a vector of transformed data is shown. An input data vector in monotonic order {X0, X1, X2, . . . X(N-1)} is provided at input 101 to a transform function 103. The transform function is typically implemented in a processor (e.g., digital signal processor, etc.) executing appropriate firmware or software Typically the data vector is in the time domain and the transform function provides a vector of transformed data at output 105. In some embodiments, the transform function provides a Decimation In Frequency (DIF) Discrete Fourier Transformation (DFT) and this can be a mixed radix DFT in some embodiments. The vector of transformed data is often Fast Fourier transformation (FFT) coefficients (complex) describing the input data in the frequency domain at discrete frequencies. Thus the first transform function is coupled to the data vector at 101 and is configured and operable to provide a vector of transformed data. As is known, a FFT provides a vector of transformed data, however this vector is a permutation of the desired DFT, i.e., is not in monotonic order and thus may need to be reordered for subsequent use.

The vector of transformed data is provided to a reordering function 107, which also does subcarrier mapping in some embodiments. As will be appreciated, subcarrier mapping includes placing certain symbols onto various subcarriers, e.g., pilot symbols or the like. An output of the reordering function is coupled in some embodiments to a second transform function 109. The second transform function is implemented in a similar manner to the first transform function, i.e., a processor and firmware or the like. The second transform function is suitably configured to access a re-sequenced or re-ordered vector of transformed data and provide a vector of inverse transformed data at output 111. Typically, the second transform function is an inverse transform function where the frequency coefficients as manipulated by the reordering function and subcarrier mapping are transformed back to the time domain and provided at output 111. In the depicted embodiment the transform is a DIF Inverse FFT (IFFT), which as is known is merely a variant of the original FFT or DFT.

The reordering function includes in varying embodiments a plurality of counters 113. The plurality of counters and other reordering circuitry, which can be embodiment dependent circuitry, can be utilized to implement the reordering function. In typical embodiments the reordering function or circuitry including counters, etc. is programmable or configurable to perform appropriate tasks. Some of these tasks and the configuration are discussed below. The reordering function is arranged and operable to determine a plurality of offset addresses, with a, respective, offset address for each element in the vector of transformed data. Each, respective, offset address defines an address relative to a first address for a first element in the vector of transformed data. For example if the vector of transformed data is Y0, Y1, ... Y(N-1), one embodiment of a 30 point FFT algorithm will provide an output vector in the following order for the first 3 terms or elements Y0, Y15, Y5. Thus if we want the data in order we need to know where to find Y1, etc. (for this example and as will be further discussed below the offset addresses respectively is Y0=0, Y15=1, Y5=2, and Y1=6) and thus if the value for Y1 is required, it can be accessed in the 6th location (0, 1, 2, ... 6 ...) in the vector of transformed data, i.e., it is offset or has an offset address of 6 relative to the first element Y0.

As suggested in FIG. 1 the reordering function can add a base address or a guard band via adder 115 to the offset addresses to indicate a location in local memory (not specifically shown) where the vector of transformed data is stored. Thus in one or more embodiments the data reordering system includes an adder, e.g., adder 115, that is operable to add a base address that corresponds to the first address (of the first element) to the each, respective, offset address to provide a sequence of addresses suitable for accessing the vector of transformed data to provide a re-sequenced vector of transformed data. Additionally, in some embodiments, a bit reversing function 117 that is coupled to the adder and operable such that each of the sequence of addresses includes a bit reversed portion and the vector of inverse transformed data at 111 is in a linear order or monotonically increasing order.

In some embodiments, this entails bit reversing the last n bits of the offset address or offset address added to a base address, etc., where n is, e.g., the product of all radix 2 stages. This provides the transformed data to the inverse or second transform function in an order such that its output at 111 will be in the proper or monotonic order. It will be appreciated that the reordering function in varying embodiments can provide, to the second transform function, the vector of transformed data as a re-sequenced vector of transformed data or simply provide the offset address or offset address plus base address, etc, i.e., a sequence of addresses with appropriate bits reversed.

Figure 2:
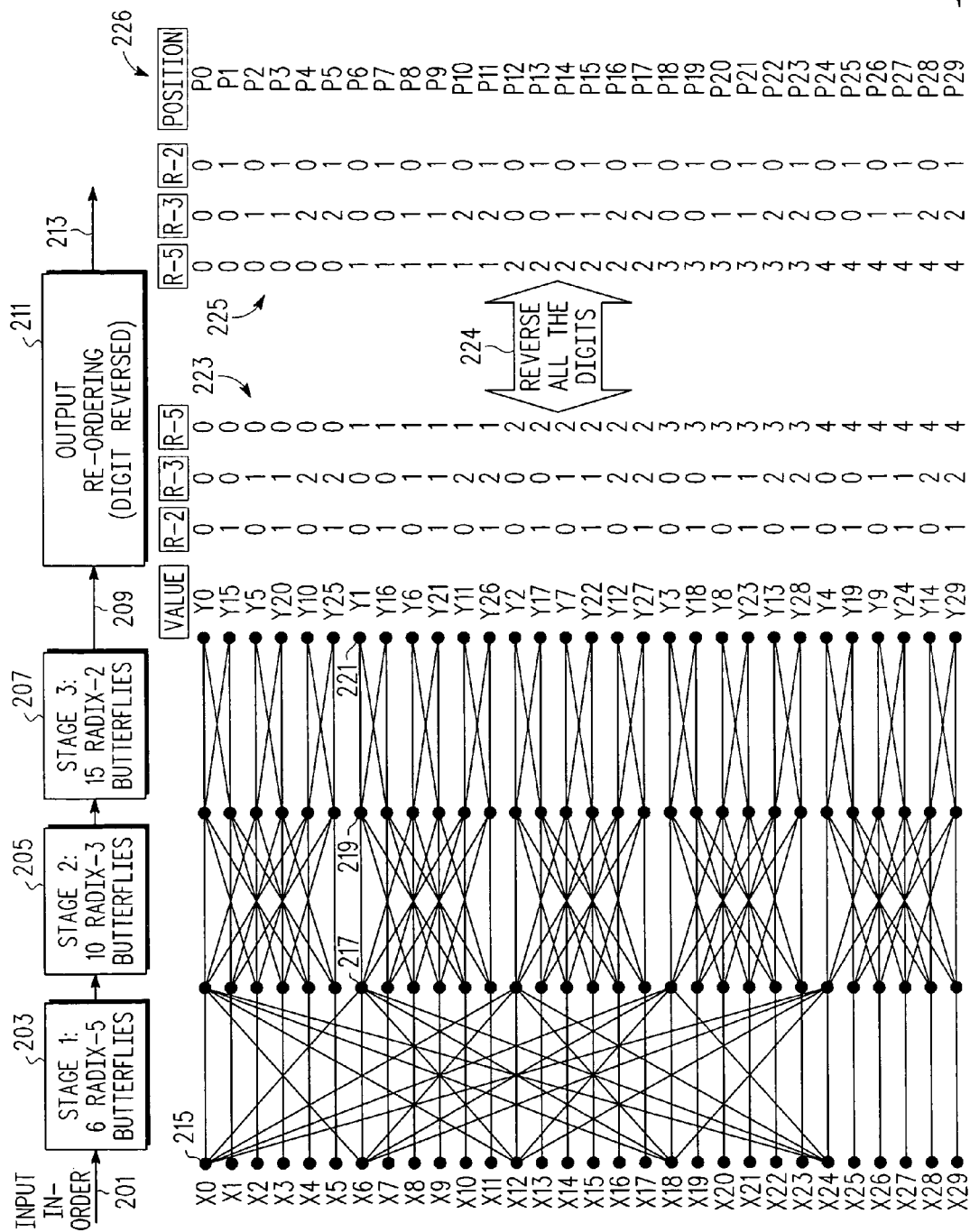
FIG. 2 in a representative form, shows a 30 point mixed radix transform with a resultant output vector that illustrates one or more re-ordering issues.

Referring to FIG. 2, a representative diagram of a 30 point mixed radix transform with the resultant output vector that illustrates one or more re-ordering issues will be briefly discussed and described. FIG. 2 shows an input data vector 201 (X0, X1, X2, ... X(N−1)) with N=30, in this illustrative embodiment, at an input of stage 1 203 (note that the physical input or output and the data vectors may alternatively use the same reference numeral herein). Stage 1 includes 6 radix 5 butterflies (named after the general appearance) (note that 5×6=30). It is appreciated that only a partial set of lines is shown in FIG. 2 and that each line represents a weighted version of the input data element (e.g., right hand side of line), which is an element of the input data vector 201 for Stage 1. As shown, Stage 1 203 is coupled to Stage 2 205, which is comprised of 10 radix 3 butterflies (note 3×10=30). Stage 2 is coupled to Stage 3 207, which is comprised of 15 radix 2 butterflies (note 15×2=30) and the output 209 of Stage 3 is the vector of transformed data YN=(Y0, Y1, Y2, ... Y(N−1)).

As illustrated and as generally known in a multi stage FFT each input element to a given stage is weighted, with the weighted input element combined with other such weighted elements to provide an output of that stage and input to successive stages. For example, input X0 is weighted and is one element provided to each of 5 outputs (see 5 lines from X0, one to each radix 5 butterfly) from radix 5 stage 1. For example, output 217 from Stage 1 is a weighted linear combination of X0, X6, X12, X18, and X24. Similarly output 217 is an input to three outputs from radix 3 Stage 2 (see 3 lines from 217). An output 219 from Stage 2 is a linear combination of 3 weighted inputs (217, etc. see 3 lines input to 219). An output 221 from Stage 3 is a linear combination of 2 weighted inputs (219, etc. see 2 lines input to 221). It is known that each output element of vector YN is a linear combination of the 30 input elements of XN. It will also be appreciated that the output vector or vector of transformed data at output 209 is not in a monotonic or monotonically increasing order, e.g., output element Y1 is the seventh output element or occupies position P6 in the vector P=(P0, P1, P2, ... ). It is generally known or can be determined what the output order will be for a given FFT. It can be more difficult to find this for a given FFT or efficiently find this when a large number of different FFT can be used, i.e., as in 3GPP LTE.

The output of Stage 3 is applied to reordering function 211 and in some embodiments this amounts to a digit reversal method or apparatus. The digits in the columns at 223 are a count, i.e. the column under R-2 alternates between 0 and 1 (2 states), the middle column numbers progress from 0 to 1 to 2 (3 states), and the right most column numbers under R-5 progress in increments of 1 from 0 to 4 all as shown. The number of states comes from the topology of the FFT butterflies. In this exemplary embodiment, we have radix 5 followed by radix 3 followed by radix 2 butterflies with the number of states corresponding to respective radix. This count can be interpreted; for a number xyz as $15x+5y+z$, e.g., for the number 112 to the right of X15 and beside Y22, 112 is equivalent to decimal $22=1\times15+1\times5+2$. By reversing the digits 224 in the columns 223, the columns 225 are arrived at. The digits in columns 225 are a reversed view of the columns 223 as indicated by the column headings R-5, R-3, R-2. Interpreting these numbers in the conventional manner with the left most the most significant digit for a number abc as $6a+2b+c$, e.g., the digits 112 (in column 223) in the above example are reversed by unit 224 into digits 211 (in column 225) to find $2\times6+1\times2+1=15$. Thus, we know if we need to find Y22 in the vector of transformed data we need to look in position P15. The Position vector 226 (P0, P1, P2, . . . , P(N-1)) has the offset addresses for each of the elements in the vector of transformed data. If we want Y11, we initially represent 11 as 021 (i.e., $0\times15+2\times5+1$) in column 223, reverse the digits into 120 in column 225 and we know that to find Y11, we need to look at position $10=1\times6+2\times2+0$ of the vector of transformed data.

Figure 3:
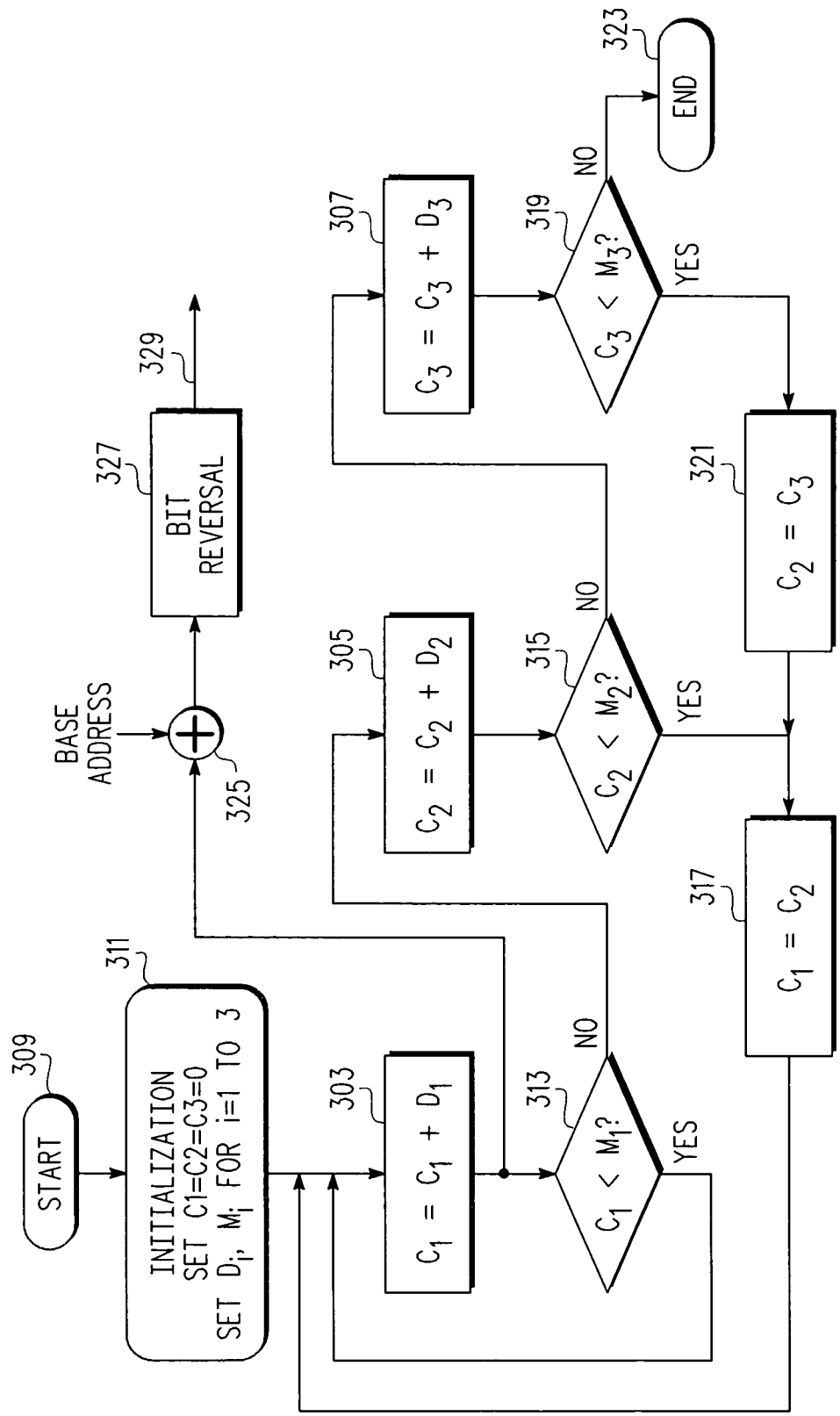
FIG. 3 depicts a representative diagram of a plurality of counters arranged and configured to provide offset addresses in accordance with one or more embodiments.

Referring to FIG. 3, a representative diagram of a plurality of counters arranged and configured to provide offset addresses in accordance with one or more embodiments will be discussed and described. FIG. 3 shows a counter arrangement to provide offset addresses for vector of transformed data, i.e., a vector of FFT coefficients provided by a mixed radix FFT. More specifically FIG. 3 illustrates a counter arrangement to provide offset addresses for a 30 point FFT; however the diagram together with the following discussions will make it clear how this approach is extended to more complex or larger FFTs. It will be appreciated that finding offset addresses does not depend on having the vector of transformed data; rather finding offset addresses only depends on knowledge of the desired FFT (number and radix of the associated stages). Thus the offset addresses can be determined while the FFT is in process and no delay is encountered.

Generally, FIG. 3 illustrates a plurality of counters with three shown, specifically counter C1 303, counter C2 305, and counter C3 307, where each of these counters is programmable or configurable and each or additional counters can be bypassed as desired. These counters are concatenated in an order based on a corresponding radix or stage in a corresponding transform, e.g., based on the order of the stage in the FFT, i.e., C1 to C2 to C3 as shown. For a general situation, a size of the FFT or IFFT is $N=\text{Prod}(r_i)$ for $I=1, 2, \ldots, R$, where $r_i$ is the radix at stage i with a total of R stages. In general there will be a counter for each stage, i.e. R counters. Each counter is configured or initialized with a respective step size Di and max or limit value Mi for the ith counter. $D_i=\text{Prod}(r_k)$ for $k=i+1$ to R and $M_i=\text{Prod}(r_k)$ for $k=i$ to R. Thus for $N=30$ and the FFT illustrated in FIG. 2, counter C1 will have a step size $D1=3\times2=6$ and a limit value M1 of $5\times3\times2=30$. Similarly C2 will have a step size $D2=2$, and limit value $M2=6$, while C3 has a step size $D3=1$. and $M3=2$. It will be appreciated that the counter sizes can be optimized for a particular re-ordering task.

To determine offset addresses, after starting at 309, all counters are initialized at 0 and configured 311 with a respective step size Di and limit value Mi. Counting starts from the first counter C1 and the outputs of C1 are the offset addresses or sequence of addresses, i.e., an nth output value of C1 indicates the location offset for Yn (Xn), where Y(X) is the output (input) of the FFT (IFFT). C1 counts by step size D1, i.e., $C1=C1+D1$ for successive counts as long as $C1<M1$ 313. When C1 reaches M1 313, i.e., when the first counter reaches its corresponding limit value, the second counter begins to count to provide a second count ($C2=C2+D2$) and, as long as $C2<M2$ 315, this second count is used to reinitialize the first counter 317, which continues to count with step size D1. When C2 reaches M2 315, counter 3 begins to count and as long as $C3<M3$ 319, both C2 and C1 are reset or reinitialized with the value of C3 321, 317. When C3 reaches M3 319 all offset addresses have been determined or generated and the counters stop 323.

FIG. 3 has illustrated an approach or method wherein after or before providing a 30 point sequence of Fast Fourier transform (FFT) coefficients from a mixed radix FFT algorithm using sequential radix 5, radix, 3 and radix 2 stages, determining addresses or offset addresses comprises concatenating three counters with a first counter having a step size of 6 and a maximum value of 30, a second counter having a step size of 2 and a maximum value of 6, and a third counter having a step size of 1 and a maximum value of 2, wherein, when the first counter reaches its maximum value of 30, the second counter begins to count to provide a second count that is used to reinitialize the first counter, when the second counter reaches its maximum value of 6, the third counter begins to count to provide a third count that is used to reinitialize the first counter and the second counter, and wherein the output of the first counter is a sequence of addresses comprising the address for each element of the sequence of transformed data.

In a more general case, providing a sequence of transformed date comprises providing a N point sequence of Fast Fourier transform (FFT) coefficients from a mixed radix FFT algorithm using R sequential radix $r_i$ stages, where the product of all $r_i$ equals N; determining an address further comprises concatenating R counters, with each counter configured to have a step size and a maximum value that is a function of one or more of the $r_i$, e.g., as above described; and when a given counter reaches its maximum value, a subsequent counter begins to count to provide a subsequent count that is used to reinitialize all earlier counters, and when an Rth counter reaches its maximum value, the method is complete and an output of a first of the R counters is a sequence of addresses comprising the address or offset address for each element of the sequence of transformed data The output of C1 or offset addresses is coupled to an adder 325 where a base address, etc. is added and result is coupled to a bit reversal function 327 which reverses the least significant n bits, where n is programmable and normally is the product of all radix 2 stages in the desired transform. The resultant address is used to access the data to be used in a subsequent transform.

Figure 4:
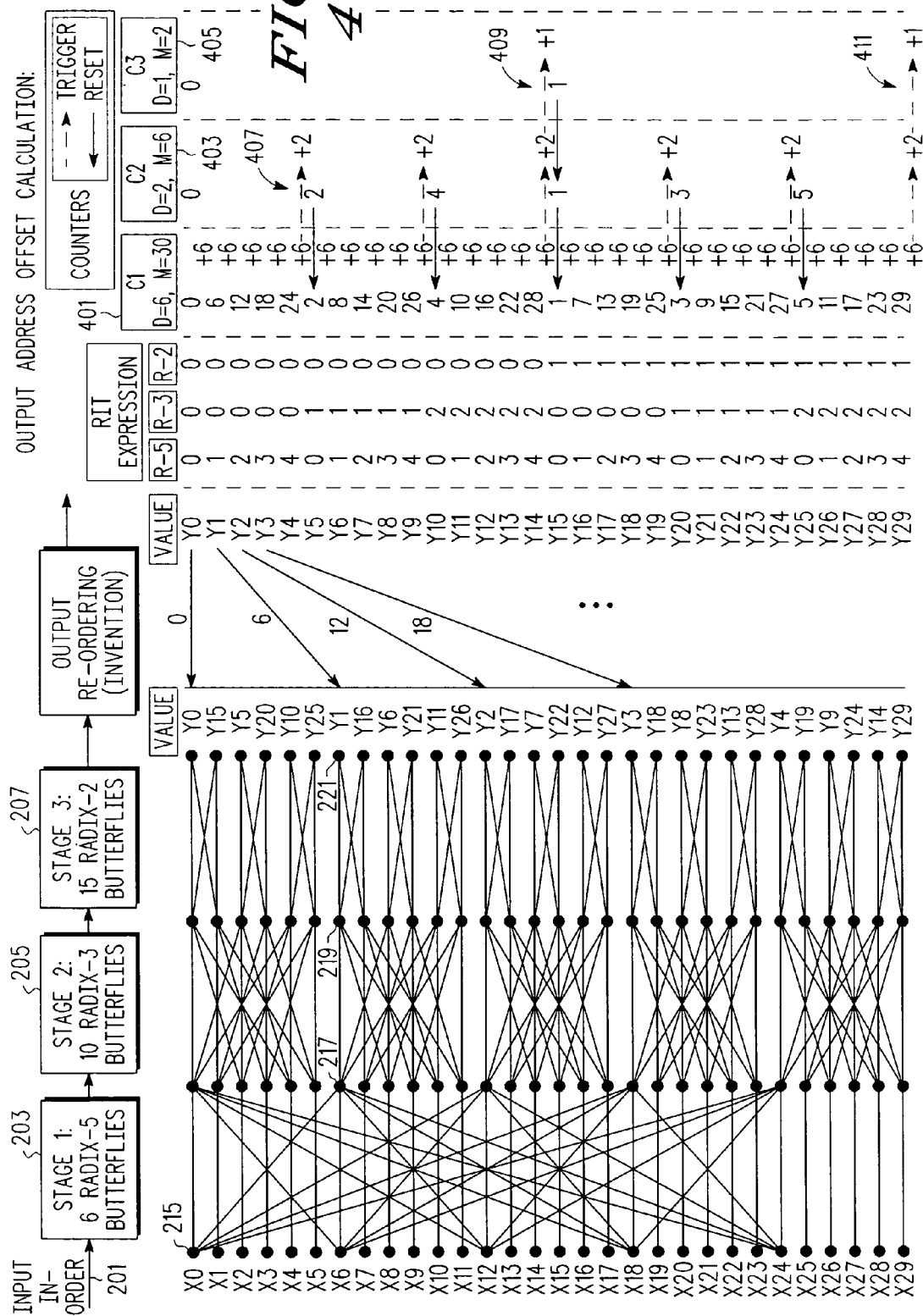
FIG. 4 depicts a representative diagram which illustrates the operation of the FIG. 3 counters in accordance with one or more embodiments.

Referring to FIG. 4, a representative diagram which illustrates the operation of the FIG. 3 counters in accordance with one or more embodiments will be discussed and described. Generally the right side of FIG. 3 duplicates the butterfly diagram for the 30 point FFT as shown in FIG. 2. As illustrated the output of counter C1 for successive counts is illustrated in column 401 along with the step size of 6 for this counter, the output of C2 is shown in column 403 with the step size of 2, and the output of C3 along with step size of 1 is shown in column 405. Additionally shown are various triggering events and reset operations 407, 409, etc. Thus counter C1 outputs 0, 6, 12, 18, 24, which are the respective locations within the vector of transformed data or offset addresses for Y0, Y1, Y2, Y3, Y4. On the next count of C1, the max or limit value is exceeded and this triggers C2 407 (see dotted line) and it increments to 2, which is used to reset or reinitialize C1 so that its output is 2, which is the offset address for Y5 in the transformed data. C1 and C2 continue to count as above until C2 exceeds its limit value at 409. This triggers C3 and the resultant count of 1 is used to reset C2 and C1. C1 and C2 continue there counts, resets, etc and C2 once again triggers C3 411 at which point it max value is reached and the process or counting ends.

Figure 5:
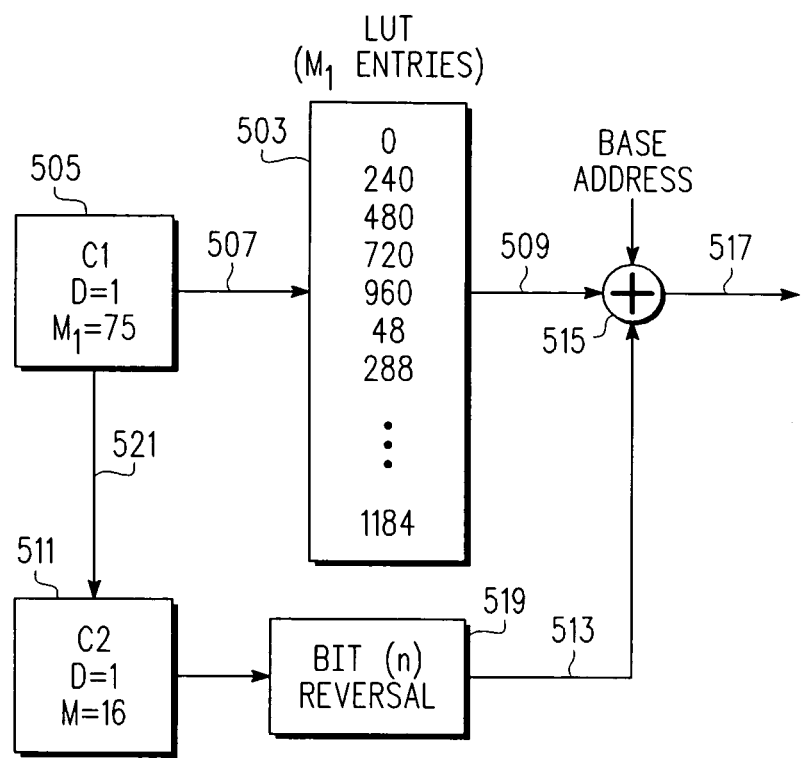
FIG. 5 depicts a representative diagram of an alternative offset address determination or data reordering system in accordance with one or more embodiments.

Referring to FIG. 5, a representative diagram of an alternative offset address determination or data reordering system in accordance with one or more embodiments will be discussed and described. FIG. 5 shows an embodiment that uses a plurality of counters in addition to a small look up table (LUT) to provide offset addresses for, e.g., a 1200 point FFT, with 7 stages including 2 radix 5 stages, 1 radix 3 stage and 4 radix 2 stages (see FIG. 6 below). FIG. 5 shows a LUT 503 and a first counter 505 operable to provide a sequence of pointer addresses at 507, where the sequence of pointer addresses can be used for addressing and retrieving a sequence of first values from the LUT at output 509. Additionally included is a second counter 511 to provide a sequence of second values at 513. An adder 515 is operable to combine, i.e., add, respective, first values and second values and in some embodiments a base address, etc. from the sequence of first values and the sequence of second values to provide a sequence of addresses or offset addresses at 517 for accessing a data vector or vector of transformed data. In some embodiments, a bit reversing or reversal function 519 is included and operable to bit reverse outputs of the second counter to provide the sequence of second values at 513. Bit reversal, when included, allows a second transform to take place with the resultant vector of transformed data ending up in the proper or monotonic order. It will be appreciated that the bit reversal function can be located at the output of counter 2, prior to the adder or at the output of the adder, if the bit reversal function is configurable or programmable to only bit reverse the last n bits, where n is the number of bits provided by the second counter.

When the transform function is operable to perform a mixed radix Fast Fourier transform (FFT) on the data vector, i.e., as noted above and shown in FIG. 2 or FIG. 6 and provide a vector of transformed data as a vector of Fast Fourier transform (FFT) coefficients, the FIG. 5 counters, LUT, etc. can provide the corresponding offset addresses or sequence of addresses for accessing/reordering the vector of transformed data. The first counter can be configured with a first limit value based on a product of all non radix 2 stages in the FFT, i.e., 5×5×3=75 and the second counter can be configured with a second limit value based on a product of all radix 2 stages in the FFT, i.e., 2×2×2×2=16. The LUT comprises a LUT with a number of entries based on the first limit value, i.e., 75 entries. With this approach a LUT with 75 entries is used rather than a LUT with 1200 entries as used in known systems.

After initialization of the counters C1, C2 to zero the first counter begins counting with a step size of 1 and successive entries in the LUT are provided along with 0 from counter 2 to the adder 515. The adder thus provides the 75 LUT entries as the first 75 offset addresses (0-74) as translated by the base address, etc. When C1 reaches its limit value, 75, C2 is triggered by C1 at 521 to count or increment by 1, C1 resets to 0 and points to the first entry in the LUT which is added to C2 as bit reversed, i.e., 0001 bit reversed is 1000 or decimal 8 and offset address 75 is provided. C1 again sequentially counts and provides pointer addresses to the LUT and successive entries in the LUT are provided along with the output of C2 as bit reversed. In this manner 8 is added to all entries in the LUT to provide the next 75 offset addresses (75-149), after which C2 is triggered to provide an output of 0010, which when bit reversed is 0100 or decimal 4. These counting, resetting, etc. processes continue until C2 reaches 1111 (bit reversed 1111 or decimal 15) which is added to each entry in the LUT for the last 75 addresses. When C2 reaches its limit value, here 16, i.e., after the last 75 offset addresses, the counts and the sequence of addresses are finished.

Figure 6:
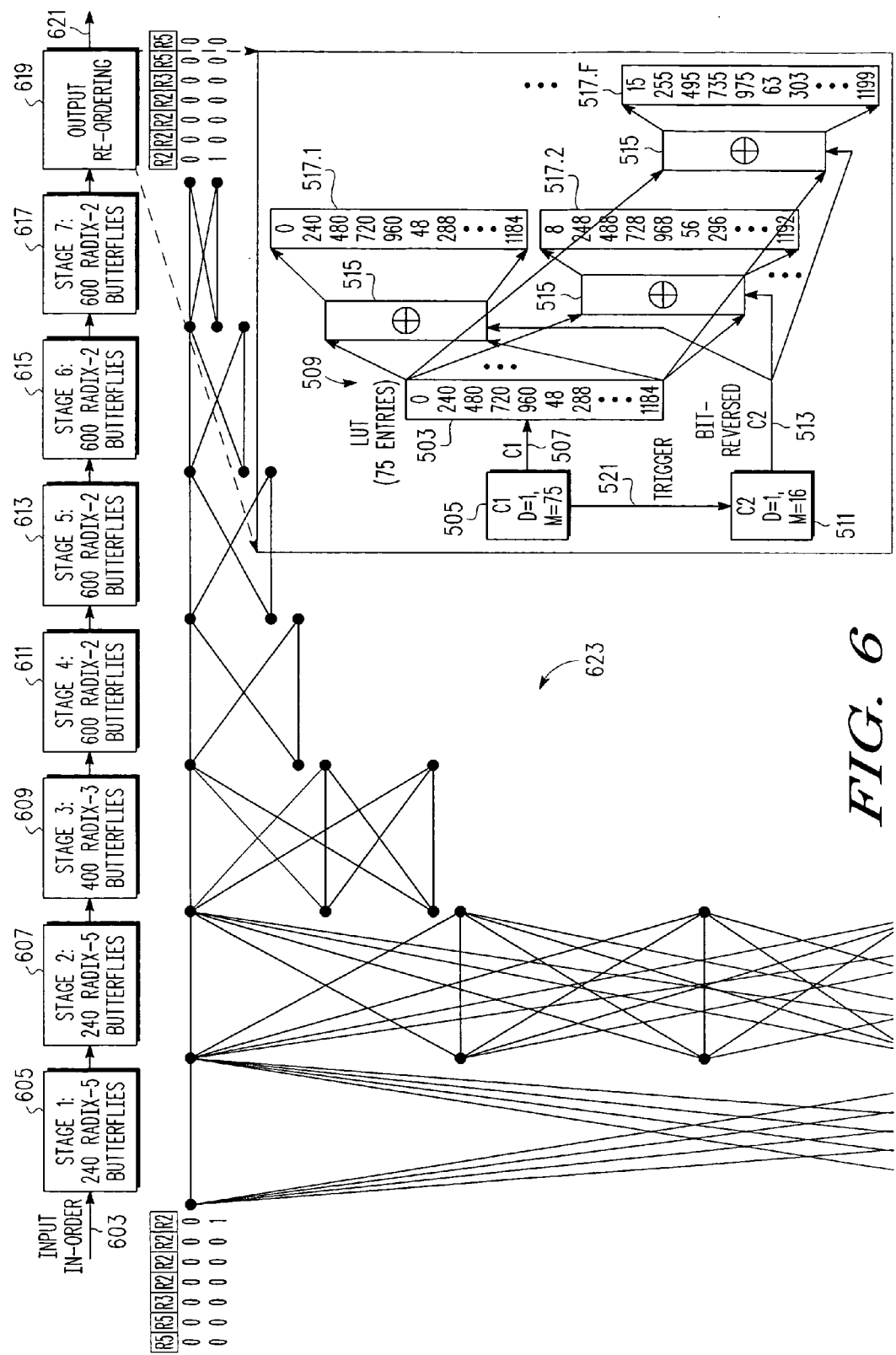
FIG. 6 illustrates additional detail for a 1200 point FFT and some operational examples of the FIG. 5 system in accordance with one or more embodiments.

Referring to FIG. 6, additional detail for a 1200 point FFT and some operational examples of the FIG. 5 system in accordance with one or more embodiments will be discussed and described. FIG. 6 shows the above summarized FFT as a seven stage FFT with the stages sequentially intercoupled as shown where the stages are; a first stage 605 using 240 radix 5 butterflies and coupled to an input vector 603 that is in monotonic order, a second stage 607 using 240 radix 5 butterflies, a third stage 609 using 400 radix 3 butterflies, and a fourth through seventh stage 611, 613, 615, 617, each using 600 radix 2 butterflies. The output of the seventh stage 617, a vector of transformed data, is coupled to a reordering function 619, which provides a properly ordered vector of data or sequence of address at 621. A partial butterfly diagram 623 is also shown.

FIG. 6 also shows the first counter C1 505 providing pointer addresses 507 to the LUT 503, which provides first values at 509 and a second counter C2 511, triggered by C1 at 521, providing bit reversed second values at 513. In operation as noted above, the counters C1, C2 are initialized to 0 and then C1 counts from 0-74 and sequentially accesses the 75 LUT entries which are output at 509 and added by adder 515 to C2=0 to provide the 75 offset addresses shown at 517.1. When C1 counts again it triggers C2 for a count and C1 resets to 0. A bit reversed version of C2=1000 or 8, is added to the first entry (0) from the LUT and an offset address of 8 is provided at 517.2. C1 continues to count and the LUT entries with 8 added to each are provided at 571.2. After 15 counts of C2, its output and bit reversed output is 1111 or decimal 15, which is the added to each of the LUT entries to provide the last 75 offset address at 517.F.

With reference to various above Figures, a data reordering system for determining addresses associated with a vector of transformed data has been described and discussed, the data reordering system comprises a first transform function coupled to a data vector and operable to perform a mixed radix fast Fourier transform (FFT) to provide the vector of FFT coefficients; a reordering function including a plurality of counters, the reordering function operable to determine a plurality of offset addresses, with a, respective, offset address for each element in the vector of FFT coefficients, each, respective, offset address defining an address relative to a first address for a first element in the vector of FFT coefficients; an adder operable to add a base address that corresponds to the first address to the each, respective, offset address to provide a sequence of addresses suitable for accessing the vector of FFT coefficients to provide a re-sequenced vector of FFT coefficients; and a second transform function operable to access the vector of FFT coefficients in accordance with the sequence of addresses and provide a vector of inverse FFT data that is in monotonically increasing order.

Figure 7:
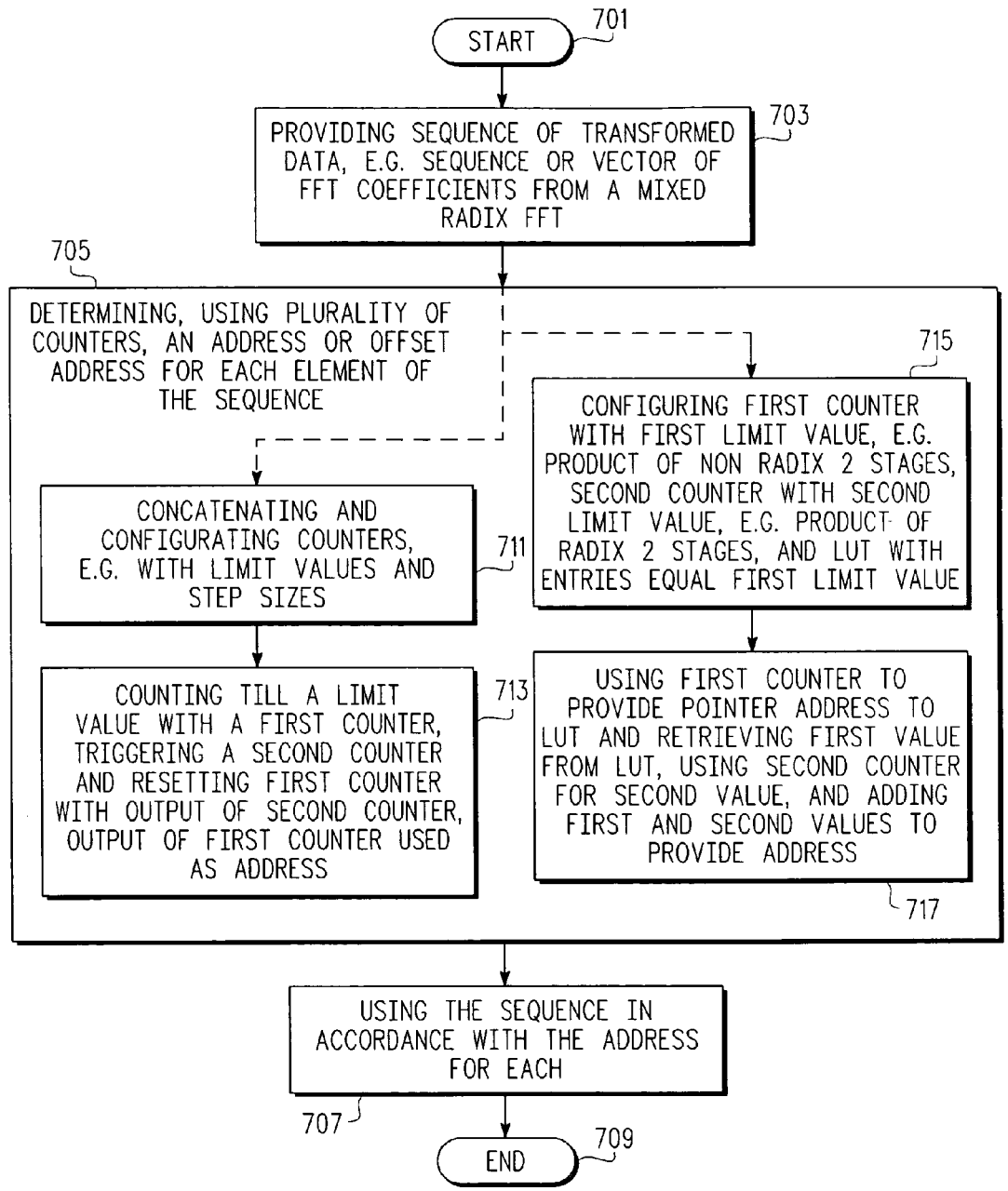
FIG. 7 shows a flow chart of representative processes executed by a method of reordering transformed data in accordance with one or more embodiments.

FIG. 7 shows a flow chart of representative processes executed by a method of reordering transformed data in accordance with one or more embodiments. It will be appreciated that these methods or processes uses many of the inventive concepts and principles discussed in detail above and thus this description will be somewhat in the nature of a summary with various details generally available in the earlier descriptions. This method can be implemented in one or more of the structures or apparatus described earlier or other similarly configured and arranged structures with similar capabilities. For example, the methods could be practiced in hardware, e.g., an integrated circuit, or software executed on a processor, e.g., digital signal processor or the like, or some combination of these approaches and techniques.

FIG. 7 illustrates various embodiments of a method of reordering transformed data. After starting 701, the method includes providing a sequence or vector of transformed data 703 comprising a multiplicity of elements or data points or values. This vector or sequence can be provided by a transform function, such as a Fast Fourier transform (FFT) or its inverse (IFFT). Thus, the sequence of transformed data may comprise a sequence of FFT coefficients and these FFT coefficients may have resulted from a mixed radix FFT. The method also comprises 705 determining, using a plurality of counters suitably arranged and configured, an address or offset address for each element of the sequence of transformed data. Each address is defining an address for a corresponding element or member relative to a first address for a first member or element of the sequence of transformed data, and the address can be used to reorder the transformed data as required.

Once the addresses for each element or member or sequence of addresses has been determined, the method shows 707 using the sequence of transformed data in accordance with the address for each element of the sequence of transformed data. The method then ends 709. The method can be repeated as needed, i.e., when a different transformation structure is used (new stage configuration is used). Note that the sequence of transformed data can actually be reordered in accordance with the address or offset address for each element or alternatively, when the transformed data is needed it can be accessed or retrieved in accordance with the offset address.

The determining the address using a plurality of counters 705 can be performed in varying embodiments as suggested by the dotted lines to 711, 713 or alternatively to 715, 717. One or more embodiments starts by configuring or programming each of the plurality of counters, e.g., with a respective or corresponding step size and limit value and concatenating the counters 711 in the order of the stage of the associated transform. As noted above with reference to FIG. 3, when the sequence of transformed data is a sequence of FFT coefficients, including instances where the coefficients are from a mixed radix FFT, there will be one counter for each stage in the transformation. The step sizes and limit values for each counter can be found using the principles and equations discussed earlier.

After initializing the counters to 0 and the other configuration processes, 713 illustrates that, after the first counter begins to count, when the first counter reaches its corresponding limit value, a second counter begins to count to provide a second count, which is used to reinitialize the first counter, which continues to count, etc. The output of the first counter is a sequence of addresses comprising the address or offset for each element of the sequence of transformed data. Bit reversing the last n bits of each address, where n can be programmable to a product of all radix 2 stages, will allow a subsequent transformation, e.g., IFFT, to be performed and provide a properly ordered output vector. A base address and guard band can be added to each of the addresses to provide a destination address in local memory.

These techniques can be extended to three stages or three counters as shown in FIG. 3. In one example where the providing a sequence of transformed date comprises providing a 30 point sequence of Fast Fourier transform (FFT) coefficients from a mixed radix FFT algorithm using sequential radix 5, radix 3, and radix 2 stages, the determining an address comprises concatenating three counters with a first counter having a step size of 6 and a maximum value of 30, a second counter having a step size of 2 and a maximum value of 6, and a third counter having a step size of 1 and a maximum value of 2. After initialization and the start of counting by the first counter, when the first counter reaches its maximum value of 30, the second counter is triggered and begins to count to provide a second count that is used to reinitialize the first counter. When the second counter reaches its maximum value of 6, the third counter begins to count to provide a third count that is used to reinitialize the first counter and the second counter. When the third counter reaches its maximum value, all addresses have been provided at the output of the first counter. The output of the first counter is a sequence of addresses comprising the address for each element of the sequence of transformed data. Extending these techniques to more than 3 stages is straight forward given the discussions herein, i.e., the next counter would be concatenated to the previous and its count would be used to reset all earlier counters and the sequence or listing of addresses would be complete when the final or last concatenated counter reached its limit value.

In alternative embodiments, determining the address includes 715 configuring a first counter with a first limit value, e.g., equal to or based on a product of all non radix 2 stages in the associated transform, a second counter with a second limit value, e.g. equal to or based on a product of all radix 2 stages, and loading a look up table (LUT) with a number of entries based on the first limit value, where the specific values for these entries are generally known or can be determined by those of ordinary skill for a given transformation or FFT (IFFT) structure.

After configuration and initialization of all counters to 0 or an initial value, the method comprises 717 using a first counter to provide pointer address, using the pointer address to access and retrieve a first value from the LUT at a location corresponding to the pointer address, using a second counter to provide a second value, and combining or adding the first value and the second value to provide the address. In some embodiments bit reversing the output of the second counter is performed to provide the second value. The combining or adding can include adding a base address and guard band to provide the destination address for the elements of the transformed data.

The method includes counting with the first counter from an initial value up to the first limit value to provide a pointer address, ranging from 0 or an initial value up to the first limit value minus 1, e.g., if 75 is the limit value, 75 pointer addresses ranging from 0 to 74 can be provided. When the first counter reaches the first limit value, triggering the second counter for a count and resetting the first counter to the initial value occurs. As discussed above this continues until the second counter reaches its limit value.

It will be appreciated that the above described functions and structures may be implemented in one or more integrated circuits as a complete hardware solution to reordering transformed data. The processes, apparatus, and systems, discussed above, and the inventive principles thereof are intended to and can alleviate prior art approaches that use large look up tables to handle large varieties of transformation configurations such as found in 3GPP LTE systems and equipment.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of reordering transformed data, the method comprising:
    providing a sequence of transformed data;
    determining, using a plurality of counters suitably arranged and selectively configured each with a programmable step size and programmable maximum value, an address for each element of the sequence of transformed data, the address defining an address relative to a first address for a first element of the sequence of transformed data, the address used to reorder the transformed data; and
    using the sequence of transformed data in accordance with the address for each element of the sequence of transformed data,
    wherein the determining an address further comprises concatenating the plurality of counters and wherein, when one counter reaches its corresponding maximum value, another counter begins to count to provide a count, and
    wherein an output of the one counter is a sequence corresponding in part to the address for each element of the sequence of transformed data.

2. The method of claim 1 wherein the sequence of transformed data includes a sequence of Fast Fourier transform (FFT) coefficients from a mixed radix FFT and wherein the determining an address further comprises configuring each of the plurality of counters with a, respective, step size and maximum value each depending on a radix corresponding to each respective counter.

3. The method of claim 2 wherein the concatenating the plurality of counters occurs in an order based on a corresponding stage of transformation, and wherein, when a first counter reaches its corresponding maximum value, a second counter begins to count to provide a second count, the second count used to reinitialize the first counter, and
    wherein an output of the first counter is a sequence of addresses comprising the address for each element of the sequence of transformed data.

4. The method of claim 1 wherein:
    the providing a sequence of transformed data comprises providing a N point sequence of Fast Fourier transform (FFT) coefficients from a mixed radix FFT algorithm using R sequential radix r_i stages, the product of all r_i equal to N;
    the determining an address further comprises concatenating R counters, with each counter programmed to have a step size and a maximum value that is a function of one or more of the r_i; and
    when a given counter reaches its maximum value, a subsequent counter begins to count to provide a subsequent count that is used to reinitialize all earlier counters, and when an Rth counter reaches its maximum value, the method is complete and an output of a first counter is a sequence of addresses comprising the address for each element of the sequence of transformed data.

5. The method of claim 1 wherein the determining an address further comprises:
    using a first counter to provide a pointer address;
    using the pointer address to retrieve a first value from a lookup table (LUT);
    using a second counter to provide a second value; and
    combining the first value and the second value to provide the address.

6. The method of claim 5 further comprising bit reversing an output of the second counter to provide the second value and wherein the combining the first value and the second value further comprises adding the first value and the second value to provide the address.

7. The method of claim 5 wherein:
    the providing a sequence of transformed data comprises providing a sequence of Fast Fourier transform (FFT) coefficients from a mixed radix FFT algorithm; and
    the determining an address further comprises configuring the first counter with a first maximum value and configuring the second counter with a second maximum value.

8. The method of claim 7 wherein:
    the configuring the first counter with a first maximum value further includes programming the first counter with a first maximum value that is based on a product of non radix 2 stages in the mixed radix FFT algorithm; and
    the configuring the second counter with a second maximum value further comprises programming the second counter with a second maximum value based on a product of radix 2 stages in the mixed radix FFT algorithm.

9. The method of claim 7 further comprising loading the LUT with a number of entries based on the first limit value.

10. The method of claim 7 further comprising:
    counting with the first counter from an initial value to the first maximum value; and
    when the first counter reaches the first maximum value, triggering the second counter for a count and resetting the first counter to the initial value.

11. A data reordering system including circuitry for determining addresses associated with a vector of transformed data, the data reordering system comprising:
    a first transform function coupled to a data vector and operable to provide the vector of transformed data;
    a reordering function including a plurality of counters selectively configured each with a programmable step size and programmable maximum value, the reordering function operable to determine a plurality of offset addresses, with a, respective, offset address for each element in the vector of transformed data, each, respective, offset address defining an address relative to a first address for a first element in the vector of transformed data; and
    an adder operable to add a base address, corresponding to the first address, to the each, respective, offset address to provide a sequence of addresses suitable for accessing the vector of transformed data to provide a re-sequenced vector of transformed data,
    wherein the plurality of counters are concatenated in an order and wherein, when one counter reaches a predetermined value, another counter begins to count to provide another count, and
    wherein an output of the one counter is a sequence corresponding in part to the address for each element of the sequence of transformed data.

12. The data reordering system of claim 11 further comprising a second transform function suitably configured to access the re-sequenced vector of transformed data and provide a vector of inverse transformed data.

13. The data reordering system of claim 12 further comprising a bit reversing function coupled to the adder and operable such that each of the sequence of addresses includes a bit reversed portion and the vector of inverse transformed data is in a linear order.

14. The data reordering system of claim 11 wherein the first transform function is operable to perform a mixed radix Fast Fourier transform (FFT) on the data vector and provide the vector of transformed data as a vector of Fast Fourier transform (FFT) coefficients and wherein each of the plurality of counters is programmed with a, respective, step size and maximum value.

15. The data reordering system of claim 14 wherein the plurality of counters are concatenated in an order based on a corresponding radix, and wherein, when a first counter reaches its corresponding maximum value, a second counter begins to count to provide a second count, the second count used to reinitialize the first counter, and wherein an output of the first counter is a sequence of addresses comprising the offset address for each element of the vector of transformed data.

16. The data reordering system of claim 11 further comprising:
a look up table (LUT);
a first counter to provide a sequence of pointer addresses, the sequence of pointer addresses for retrieving a sequence of first values from the LUT; and
a second counter to provide a sequence of second values;
wherein the adder is further operable to combine, respective, first values and second values from the sequence of first values and the sequence of second values to provide the sequence of addresses.

17. The data reordering system of claim 16 further comprising:
a bit reversing function operable to bit reverse outputs of the second counter to provide the sequence of second values; and
wherein the adder is further operable to add, respective, first values and second values from the sequence of first values and the sequence of second values to provide the sequence of addresses.

18. The data reordering system of claim 16:
wherein the first transform function is operable to perform a mixed radix Fast Fourier transform (FFT) on the data vector and provide the vector of transformed data as a vector of Fast Fourier transform (FFT) coefficients;
wherein the first counter is programmed with a first maximum value based on a product of all non radix 2 stages in the FFT and the second counter is programmed with a second maximum value based on a product of all radix 2 stages in the FFT; and
wherein the LUT comprises a LUT with a number of entries based on the first limit value.

19. The data reordering system of claim 18 wherein the first counter is operable to sequentially count from an initial value to the first maximum value; and
when the first counter reaches the first maximum value, trigger the second counter for a count and reset the first counter to the initial value.

20. A data reordering system including circuitry for determining addresses associated with a vector of transformed data, the data reordering system comprising:
a first transform function coupled to a data vector and operable to perform a mixed radix fast Fourier transform (FFT) to provide a vector of FFT coefficients;
a reordering function including a plurality of counters selectively configured each with a programmable step size and programmable maximum value, the reordering function operable to determine a plurality of offset addresses, with a, respective, offset address for each element in the vector of FFT coefficients, each, respective, offset address defining an address relative to a first address for a first element in the vector of FFT coefficients;
an adder operable to add a base address that corresponds to the first address to the each, respective, offset address to provide a sequence of addresses suitable for accessing the vector of FFT coefficients to provide a re-sequenced vector of FFT coefficients; and
a second transform function operable to access the vector of FFT coefficients in accordance with the sequence of addresses and provide a vector of inverse FFT data that is in monotonically increasing order,
wherein the plurality of counters are concatenated in an order based on a corresponding radix, and wherein, when a first counter reaches its corresponding maximum value, a second counter begins to count to provide a second count, the second count used to reinitialize the first counter, and
wherein an output of the first counter is a sequence of addresses comprising the offset address for each element of the vector of transformed data.

* * * * *